INVENTOR.
DARWIN KRUCOFF
BY Robert O. Richardson
- ATTORNEY - united States Patent Office 3,445,757
Patented May 20, 1969

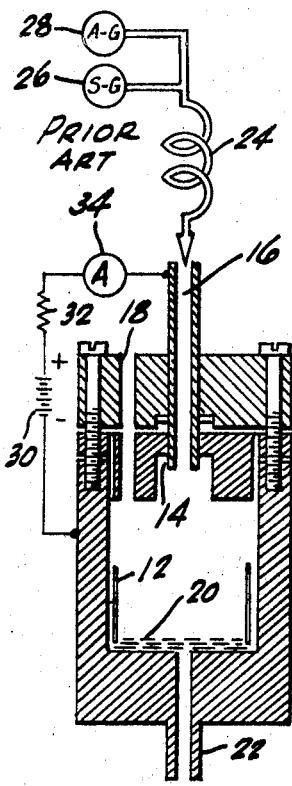
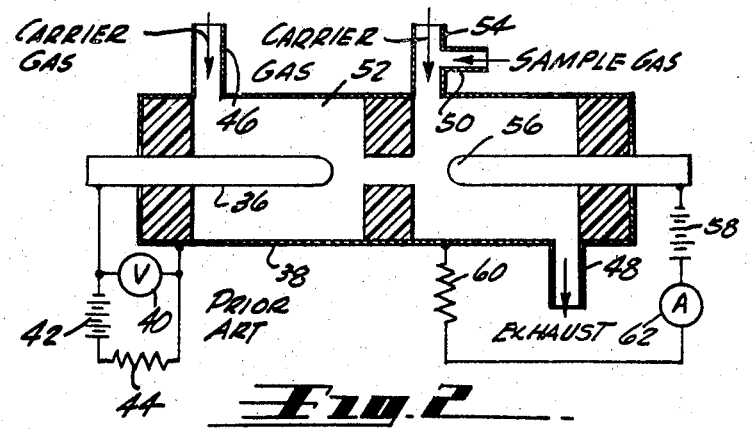
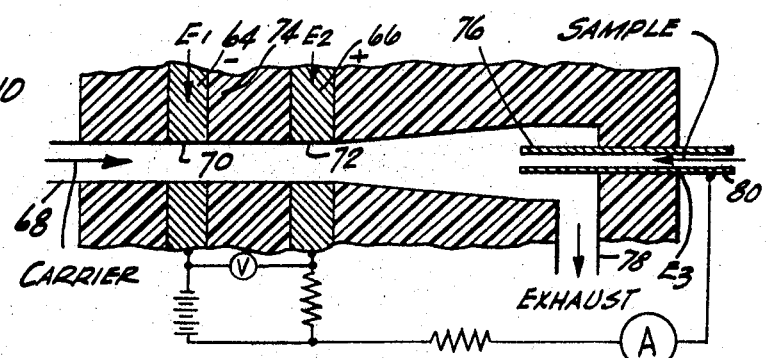
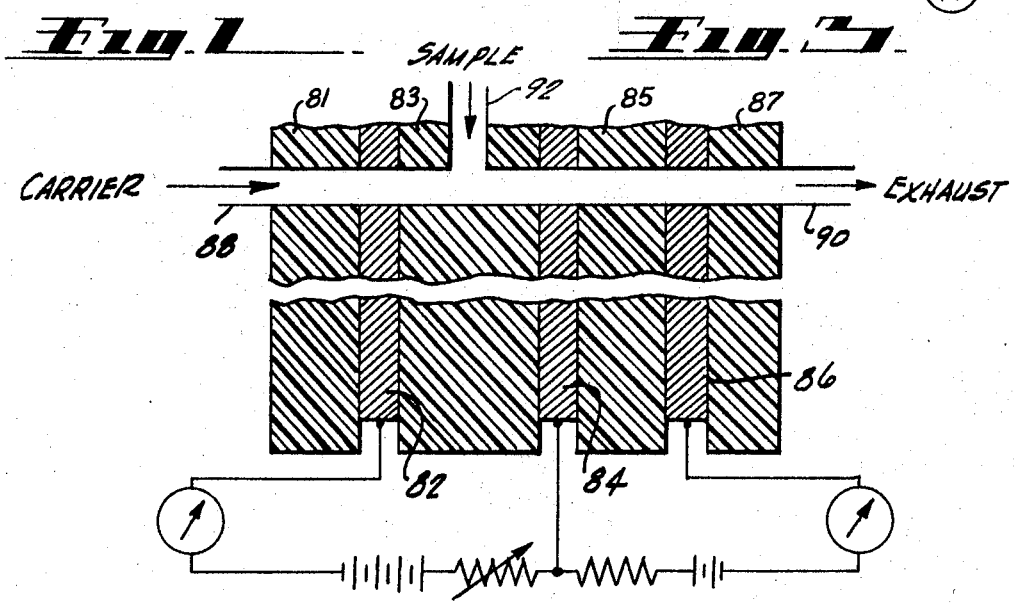

3,445,757
CAPILLARY IONIZATION GAS DETECTOR AND ANALYZER USING TIMED INTERVAL CURRENT FLUCTUATIONS
Darwin Krucoff, Costa Mesa, Calif., assignor, by mesne assignments, to McDonnell Douglas Corporation, a corporation of Maryland
Filed Oct. 14, 1965, Ser. No. 496,113
Int. Cl. G01n 27/62; G01 11/44
U.S. Cl. 324—33                    4 Claims

ABSTRACT OF THE DISCLOSURE

A capillary ionization gas detector and analyzer for use in gas chromatography techniques. Spaced conductive plates with a gas flow path therebetween ionizes gas flowing therethrough with a resulting current change when a gas impurity or sample of a different gas is passed.

Background of the invention

Gas chromatography provides a unique instrumentation technique for detecting and quantitatively measuring a wide range of gaseous toxic compounds at concentrations as low as one part per billion. Basically, the system consists of a retention column and a detector. The column serves to separate the individual molecular species of the mixture by providing a characteristic rate of travel through the column for each substance. Thus, the carrier gas of a known substance with other gases therein can be passed through the column and these other gases, called samples, would be separated from the normal gas constituents and from each other. The detector is placed at the exit of the column and provides a quantitative measure of each component as it is passed from the column. The ultimate sensitivity of the system and its dynamic range are primarily determined by the type of detector used.

In prior art systems, the retention column typically is of copper tubing, ⅛ inch in diameter and about 20 feet long, coiled to make it compact. The flow rate of gas typically is about 100 cc. per minute and the detection of each sample that is typically of ten seconds duration. The total process time is on the order of ten minutes. All of this requires a gas supply of the certain size tank, under a pressure typically of 3,000 pounds per square inch. The total package then is of necessity a certain minimum size and weight.

Military and outer-space applications continually require reduction in weight and size. In the miniaturization of the gas analysis package, it is possible to resort to a capillary retention column having internal diameters of from .010 inch to as small as .0015 inch. These small columns enable the use of much smaller samples and also provide more rapid operating cycles. They further allow a reduction in the overall size, weight, and power requirements of this system.

In order to fully utilize the advantages of capillary columns, it is necessary to develop a more highly sensitive detector having a gas container with an active volume of about $10^{-3}$ cc. or less instead of a detector volume of 1 cc., which is typical of present detectors. In order to decrease the flow rate, to save on carrier gas and thus reduce the size of its container, as well as simultaneously speeding up the time required for analysis, the detector volume must be drastically reduced. For this reason, the detector must now be made smaller and thus faster than existing detectors. In order to reduce the flow rate 100 times, and speed up the process 100 times, the residence time of the gas within the detector must be reduced 10,000 times. In addition to achieving this reduction in size of the detector, with a resultant reduction in size of the overall gas chromatography system, the capillary ionization detector of the present invention provides for the detection of a wider range of gas samples with high sensitivity.

Summary of the present invention

Briefly, the present invention provides for a novel gas detector and analyzer having a novel electron source for ionization of the gases. This permits a reduction in size of the detector and permits a faster reading with less gas, over a wider range of gas samples. This novel detector utilizes a pair of parallel conductive plates with a linear electric field established across them. The plates are spaced by a dielectric having an orifice through which the carrier gas with spaced samples may be passed. The linear electric field and annular electrode configuration ionizes the gas to produce electrons yet permits a large fraction of them to pass beyond the field to a third electrode. These electrons passing to the third electrode constitute a current which changes due to the presence of a sample. A current detection device thus indicates the presence and quantity of a gas impurity sample. By matching its time interval from the commencement of the analysis procedure with known time intervals for the passage of known gases through the system, as identification may be made of the sample.

Brief description of the drawings

A better understanding of the present invention may be had with reference to the accompanying drawings wherein:

FIGURE 1 is a schematic view of one prior art system;

FIGURE 2 is a schematic view of another prior art detector;

FIGURE 3 is a schematic view of one embodiment of the present invention, and

FIGURES 4 to 7 are schematic views of other embodiments.

Description of the illustrative embodiments

Figure 5:
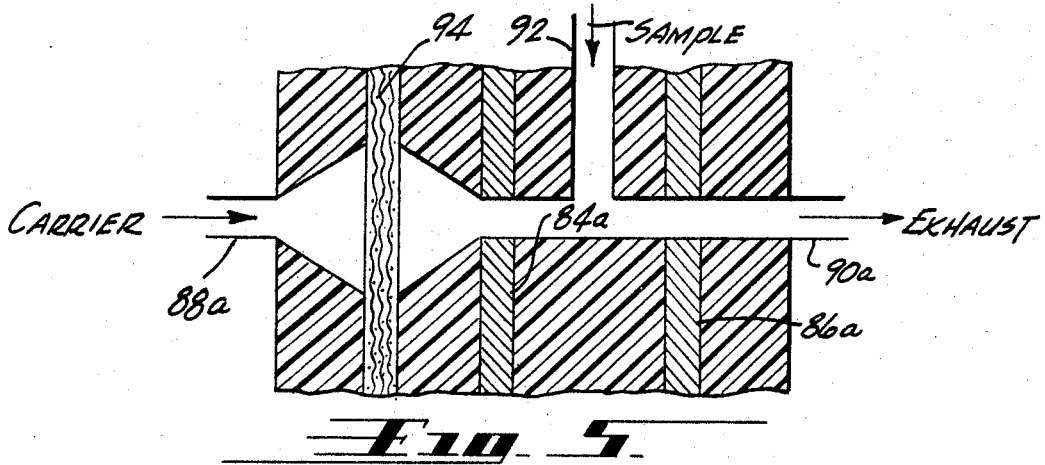

As indicated previously, the sensitivity of a gas chromatography system in its range of concentration measurement is determined almost entirely by the performance characteristics of the detector. The ability of the detector to operate at very low carrier gas flow rates is of primary importance in reducing the size, weight and analysis time of the instruments. The performance characteristics of the detector, therefore, determine to a large degree the characteristics of the gas chromatography system. Among the techniques for the detection and quantitative measurement of low concentrations of sample gas in a carrier gas include checking the variation in thermoconductivity of the carrier with the sample, the chemi-ionization caused by a hydrogen flame, and the ionization of the sample by the combined use of the radioactive source and an electric field. The thermoconductivity detector uses a hot wire bridge that is unbalanced by the presence of this sample. Higher sensitivity is provided by the hydrogen flame unit but it is sensitive only to organic compounds and requires the maintenance of a lighted hydrogen flame. Thus, for high sensitivity to a wide range of compounds with minimum complexity and maintenance, some form of ionization detector using radioactivity or a sufficiently high intensity electric field to produce electrons is required. Some of the processes occurring within prior art ionization detectors should be considered. Ionization of a gas molecule results when sufficient energy has been transferred to the molecule to remove an electron. This energy may be expressed as the ionization potential, and varies from about five to ten volts for organic compounds to a maximum of 24.4 volts for helium. The energy source may be external, such as cosmic rays passing through the ionization chamber or it may be a radioactive source within the detector. In either case, ionization is caused by the collision between gas molecules and high energy photons, electrons or alpha particles.

Within the detector an electric field is created between a pair of electrodes by means of an external source of potential. As this potential is increased, a greater fraction of the generated ions and electrons are swept to the electrodes before they can recombine or reach the walls. This accounts for an initial rise in current with field strength. With a sufficiently high field strength, all of the ion pairs generated would reach the electrodes. This produces a plateau on a current output indicating curve. With further increase in field strength, the electrons acquire sufficient energy from the field between collisions to generate additional ionization. This is known as gas multiplication and produces the second current rise. Finally, a breakdown condition is reached in which the current is limited only by the external resistance of the circuit. In order to maintain voltage breakdown, additional electrons must be liberated from the cathode to create new ionization avalanches. These electrons are provided by photoelectric emission and a collision of positive ions with the cathode.

Another process occurring within the detector is that of a recombination of ions and electrons before they reach the electrodes. It has been found that losses will be least when the chamber is small and the highest possible potential is used. In a free electron gas, such as argon or helium, the electrons are so rapidly collected at the anode that an excess of slowly moving positive ions remains in the detector. This excess of positive ions collects as a cloud or space charge near the cathode and exerts a potential in opposition to that applied to the electrodes.

The collection of ions within ionization detectors may be given a variety of characteristics by operating at different values of the field strength. At a field strength just below the saturation plateau the detector may be operated in the electron capture mode. This type of detector is highly sensitive but is useful only with gases having a high electron affinity, such as oxygen or halogens. At a higher operating point in the plateau the detector is in the cross section mode and is responsive to a wide range of substances but has low sensitivity. At a still higher point in the gas multiplication region below the breakdown, high sensitivity and a wide response is obtained with argon as the carrier gas. This is the operating region for the argon ionization detector shown in FIGURE 1. Finally, with voltage breakdown, corona discharge detector operation is obtained with a device shown in FIGURE 2. This detector has high sensitivity and is responsive to a wide range of sample gases. Usually the detector is operated as a diode using only ½ the structure shown in FIGURE 2.

Further reference is now made to FIGURE 1, which shows a container 10 having a foil 12 around the inside. This foil contains a beta-emitting radioactive material such as tritium or $Sr^{90}$ to provide a source of primary electrons. A relatively large gas volume must be provided to allow the high energy primary electrons (18 kev. for tritium, 0.5 mev. for $Sr^{90}$) to slow down by collosion with carrier gas atoms and produce additional electrons by ionization. These electrons are then accelerated toward the anode 14 by the electric field within the detector. The bottom part of the container is for the purpose of supplying low energy electrons to the anode 14. This produces some excited or metastable atoms which cause ionization of the sample gas but not the carrier gas passing through from the opening 16 and out exit 18. This lower region of container 10 may be considered as a composite cathode. A gauze or filtering material 20 is placed at the bottom of the container to filter out the turbulence of some gas coming in through tube 22. This gas is a clean argon gas passing through the cylinder to keep that area clean and to prevent the sample gas from contaminating the radioactive source or depositing itself on the foil 12. The gas coming in tube 16 comes from a retention column 24 which consists of coiled tubes having a filtering powder in them. A sample gas from container 26 is mixed with argon gas from a container 28 to pass through the retention column 24 which physically separates the samples at various time intervals so that their identity can be determined upon comparing their time intervals with the time intervals of known gases. The identification of the types of components in the gas sample are identified solely on the time basis that it takes to go through the column. This then means that argon gas is continually flowing down through the column but at discrete intervals little components of the gas samples will come through at spaced intervals of time. Electrically connecting the container 10 and foil 12 with the anode 14 is a battery 30, suitable resistance 32 and a current indicator 34. Argon ions provide a background current that flows between anode 14 and foil or cathode 12 and the sample components increase this current. These components, when they pass through the tube 14, increase the electrical conduction with the foil 12 and cause little current peaks on a graph, the amount of the component is determined by the area under the curve. The area under the peak represents the amount of the sample component. The explanation as to why the sample gases produce an increase in current is as follows: The electrons leaving the radioactive foil are slowed down by making collisions with the argon gas in the lower region of the detector which acts as a composite cathode to provide relatively low energy electrons, the electrons leaving the foil having energies in the nature of 18,000 electron volts must be reduced down to low enough energy that they can be attracted to the anode which has a total voltage of 2,000 volts or less, the lower region then takes the high energy electrons from the radioactive source, slows these electrons down by collision with argon atoms to convert them to relatively low energy electrons which are then attracted to the anode 14. In making this passage to the anode the atomic collision produces a probability of generating excited or metastable argon atoms with a much less probability of generating argon ions. The excited atoms cannot produce a background current as the relatively few argon ions do. However, the background current is negligible so that a current spike due to a sample is easily noticed. The stored energy of argon metastable atoms is 11.7 electron volts. Sample atoms are ionized by the transfer of energy from the excited argon atoms to the sample by collision between the two, providing the sample is of a material whose ionization potential is less than that of the argon. When the sample atom collides with the excited argon atom, the energy is transferred, and an output current is produced.

The argon ionization detector cannot be miniaturized because a relatively large gas volume must be provided to allow the high energy primary electrons of the radioactive energy source, such as tritium, to slow down by collision with the carrier gas atoms and produce additional electrons by ionization. The energy path required for this is from half to one centimeter in length and this then fixes the diameter of the inside of the container to at least twice that amount. A 1 centimeter container is considered a relatively large container for purposes of miniaturization as will be disclosed hereinafter.

By the provision of a different type of electron source this path may be made much shorter and thus permit a reduction in size. In fact, the volume of the detector using the principles of the present invention may be reduced on the order of 1,000 times or more. This ionization detector has another disadvantage in that it requires the use of argon gas. The carrier gas without component samples should have a lot of metastable atoms which are not electrically conductive, and which does not provide a current peak on the indicating graph. Moreover, the metastable or excited atoms must have a sufficiently long lifetime to be of use in ionizing the sample. As a practical matter argon is the only gas to meet those requirements. However, argon gas has two disadvantages. One is that the retention column does not work as effectively with argon gas as a carrier than with other gases, such as helium, for example. Secondly, the stored energy of an argon metastable atom is 11.7 electron volts which means that any substance with an ionization potential of 11.7 electron volts or greater cannot be detected. This eliminates a large number of inorganic gases and some organic compounds. Thus this detector has three disadvantages. One, it is too large; two, it requires argon gas which is poor for the retention column; and three, it is responsive only to certain gas samples. There is a possible fourth disadvantage in that it requires a radioactive source which can become contaminated and thus fail to insure proper detector performance. Also, since the gas continuously flows from column 16 around and out the exit 18, this gas may pick up some of the radioactive material and discharge it out to the atmosphere. This could have a detrimental effect particularly if this unit should be in a space cabin or some other closed space.

Reference is now had to the corona discharge detector shown in FIGURE 2. Briefly, this prior art device measures a voltage drop across the discharge anode 36 and discharge cathode 38, as represented by the voltmeter 40 in the circuit diagram which includes a battery 42 and resistance 44. Helium gas comes in as a carrier through opening 46 and out an exhaust opening 48. From time to time a sample gas may pass through inlet 46 and cause a variation in the voltage in the same manner as the device shown in FIGURE 1. The voltage peak is due to the effect of the component sample upon the various processes taking place within the discharge chamber 52 between the anode 36 and cathode 38. Electron energy distribution in the discharge and photon transmission through the inner electrode space are two processes that are affected. There are others, but only the result is deemed important here. It does have a disadvantage that it has a restricted linear range which makes the output ambiguous. The output does not increase linearly beyond a certain point at which the output goes back down again with increase in concentration or volume of the sample. Thus, it cannot be determined whether the concentration of the sample has increased or decreased when the output goes back to zero again.

Because of the coaxial construction wherein the discharge anode 36 is in the center and the discharge cathode 38 is the tubular surrounding electrode, the distance between the anode and cathode cannot be too small, because the position of the sample on the cathode surface will degrade detector performance, which carried to the extreme will cause arcing. The length of the anode 36 within the chamber must be substantial in order to have operability. Accordingly, the radius required and the length of the anode gives a volume that is not desirable. This device is not limited to argon gas but may use helium so that the type of component samples is not limited. The performance of the retention column is greatly improved, and the elimination of the radioactive energy source in the device in FIGURE 1 is still another advantage. This detector still has the disadvantage that its size is not much smaller than the one in FIGURE 1. The output tends to be ambiguous in the manner just explained, and it has a sensitive surface that tends to become contaminated.

Heretofore, the corona discharge detector in FIGURE 2 has been described in terms of the left-hand side and in terms of the anode-cathode 36, 38 functioning as a diode. FIGURE 2, however, shows two carrier sources 46 and 54 and a probe electrode 56, so that the operation is somewhat different than just described. In its entirety it is very similar to the argon ionization detector in FIGURE 1, except that the radioactive source on foil 12 has been replaced in this corona discharge electron source with the left half of the device shown. Instead of helium, argon must be used as the carrier gas, coming through opening 46 and opening 54. Since metastable argon atoms must be generated in the vicinity of the probe electrode 56, in the same manner as the first argon ionization detector, by using both halves of this device, we overcome the disadvantages of the restricted linear range earlier discussed. The left half of the apparatus now provides the electrons as a substitute for the radioactive electron source 12 in the argon ionization detector in FIGURE 1. Battery 58 and resistor 60, together with ammeter 62, complete the electric circuit. Fluctuations are detected by ammeter 62 when a sample gas comes through opening 50. The disadvantage here is that it requires argon gas with its disadvantages. There has been no saving in size and only small ampere electron currents in the range of $10^{-9}$ amperes are available.

The capillary ionization detector and analyzer of the present invention combines the advantages of the argon ionization detector and the corona discharge detector in a single unit and offers further advantages of a greatly reduced internal volume, increased sensitivity and wide dynamic range. Instead of using a coaxial configuration with a center anode and an annular cathode, a pair of parallel plates are used with a linear field across them. As shown in FIGURE 3, parallel plates 64, 66 are positioned across the path of a carrier gas passing through opening 68 and through plate orifices 70, 72. Intermediate spacer material 74 separates the plates. A corona discharge is established between plates 64 and 66. A cold electrical discharge or corona is established by producing a breakdown voltage between these two electrodes with electrode 66 positive and electrode 64 negative. This causes electrons to be generated within the region between the plates and accelerated toward the field free region adjacent anode 76 and out exhaust 78. In this illustration the sample gas comes in an orifice 80 in the anode 76. By way of illustration only, the orifice 68, through which the carrier gas flows, may typically be .0135 inch in diameter, the thickness of plates 64 and 66 may be .010 inch thick and the insulating spacer 74 may be from .030 inch to .060 inch thick. When compared to the prior art devices having a diameter of approximately one-half inch it can be seen that this configuration achieves a very small cross section for an electron source, the electrons are produced at a much lower energy than the electrons of the other source and a large number of electrons are provided.

A principal feature of this device is the shape and placement of $E_1$ and $E_2$ which permits a large fraction of the electrons which are drawn toward $E_2$ to escape and pass beyond to the useful region between $E_2$ and $E_3$. In contrast, electrons generated between anode-cathode 38 and 36 in FIGURE 2 are drawn toward cathode 36 in an increasingly intense field so that very few can reach probe 56.

A second embodiment is shown in FIGURE 4 wherein all three electrodes 82, 84 and 86 are of the same type and are alternately stacked with dielectric plates 81, 83, 85 and 87 in a linear array to provide for a clear gas passage therethrough, the carrier gas entering port 88 and leaving by exhaust port 90. With the sample gas coming through port 92 between the electrodes 82 and 84, this embodiment then is analogous to the corona discharge type detector shown in FIGURE 2. In addition to the electron source being of the novel type, the gas sample in FIGURE 4 passes only through a portion of the corona and therefore does not come in contact with a cathode 82, which is the cathode of the discharge. The detector in FIGURE 4 may also have the sample coming into the carrier gas passageway at a point between plates 84 and 86 to thereby prevent contact of the sample with the corona.

FIGURE 5 shows a further modification in that the cathode of the discharge, that is, cathode 94, is made larger and of porous metal, such as a fine mesh screen, so that the carrier gas can pass readily through it, although for positive ion bombardment it appears to be a solid surface. This modification permits stable operation of the corona at lower currents. In other respects, the structure in FIGURE 5 resembles the modification shown in FIGURE 4, with like numerals followed by the letter *a* designating the corresponding components in FIGURE 4.

Figure 6:
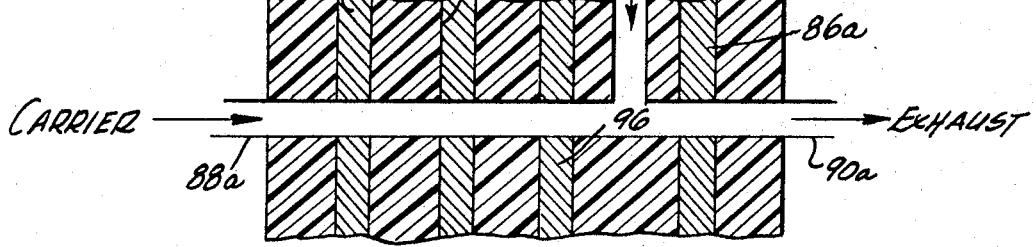

In FIGURE 6 is shown another modification in which an additional electrode 96 is shown. This electrode is used as a grid to adjust electron energy distribution of the electrons coming from the discharge plates 82a and 84a being considered as a composite cathode. Conventional circuitry involving the use of a grid to control electron emission is used in its operation. The sample gas is then brought in through opening 92a between the grid 96 and the plate 86a of this detector.

Figure 7:
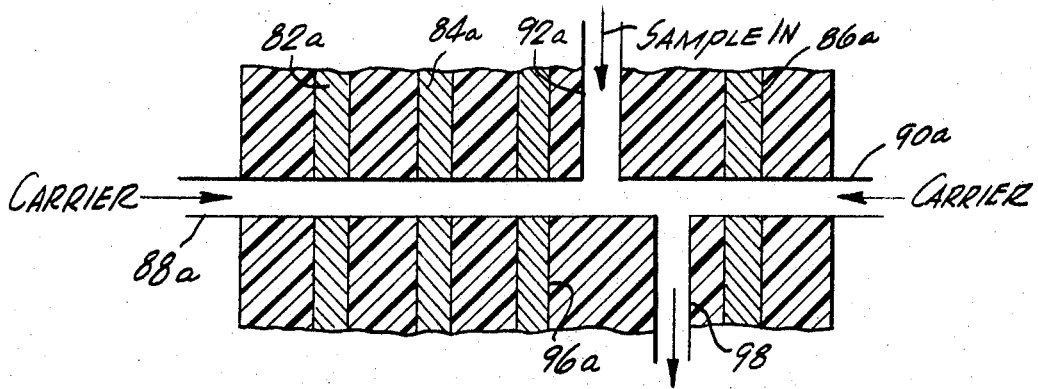

The modification shown in FIGURE 7 shows the sample entering and leaving between the grid 96a and the fourth electrode 86a, this allows all of the electrodes to be kept clean by being in contact with only clean carrier gas and the sample can then contaminate only a portion of the duct, with the gas coming in opening 92a of the insulating material and out opening 98.

A gas detector utilizing this invention, as defined over the prior art, is a gas detector having an orifice for emitting electrons in an atmospheric pressure gas, a gas detector made smaller and provided with a higher electron current than present sources, a gas detector that provides large quantities of electrons at low energies compared with existing devices. These results are accomplished through the use of a linear field rather than a coaxial field, wherein the electrons are accelerated toward their desired region and travel a shorter path than otherwise due to their lower energies. In this manner the device can be reduced in volume by an order of a thousand times or more. This permits a corresponding reduction in carrier gas flow rate and/or analysis time. The basic concept is a linear stacking of electrodes, either surrounding, extending into, or filling a small diameter gas duct with porous material such as a screen, with a side gas passage for sample introduction at any one of several places.

From the foregoing illustrations, other improvements and variations are contemplated and it is to be understood that these improvements are to be considered as part of this invention, as defined by the appended claims.

I claim:
1. A gas container for use in a gas detector and analyzer,
said container including a gas inlet, a gas outlet and structure defining a path for the passage of carrier gases therebetween,
said container including dielectric plates alternately stacked between electrode plates, said path comprising a linear aperture extending through said plates,
an opening in said container for injecting gas impurity samples into said path,
said electrical plates establishing a linear electric field along said path, when energized, for ionizing carrier gases passing therealong, and
electrode means adjacent said path for monitoring changes in electron flow along said path due to injection therein of said impurity samples.

2. A gas container as set forth in claim 1,
said opening communicating with said path at a point therealong between said annular electrodes.

3. A gas container as set forth in claim 2, and
an additional electrode between said annular electrodes and said electrode means for use as a grid means.

4. A gas container as set forth in claim 1,
said opening communicating with said path at a point therealong between said annular electrodes and said electrode means.

References Cited

UNITED STATES PATENTS

| | | | |
|---|---|---|---|
| 2,351,648 | 6/1940 | Whitlock. | |
| 2,786,144 | 3/1957 | Weisz. | |
| 2,830,945 | 4/1958 | Keidel | 324—30 XR |
| 2,871,446 | 1/1959 | Wann. | |
| 3,028,490 | 4/1962 | Guilleux. | |
| 3,176,135 | 3/1965 | Lovelock. | |
| 3,171,028 | 2/1965 | Lovelock | 250—43.5 X |
| 3,238,367 | 3/1966 | Sternberg et al. | 250—43.5 |
| 3,361,907 | 1/1968 | Gregory | 324—33 X |
| 3,378,725 | 4/1968 | Bochinski et al. | 324—33 X |

RUDOLPH V. ROLINEC, *Primary Examiner.*

C. F. ROBERTS, *Assistant Examiner.*

U.S. Cl. X.R.

324—30